United States Patent [19]

Wiebe

[11] E Re. 30,786

[45] Reissued Nov. 3, 1981

[54] DISPOSABLE IDENTIFICATION BAND BLANK

[76] Inventor: Gerald L. Wiebe, 53 E. St. Charles Rd., Villa Park, Ill. 60181

[21] Appl. No.: 957,148

[22] Filed: Nov. 2, 1978

Related U.S. Patent Documents

Reissue of:

[64] Patent No.: 4,078,324
Issued: Mar. 14, 1978
Appl. No.: 646,365
Filed: Jan. 2, 1976

U.S. Applications:

[63] Continuation of Ser. No. 464,750, Apr. 29, 1974, abandoned.

[51] Int. Cl.[3] ..... G09F 3/14
[52] U.S. Cl. ..... 40/21 C
[58] Field of Search ..... 40/21, 21 C, 2.2, 2

[56] References Cited

U.S. PATENT DOCUMENTS

| | | | |
|---|---|---|---|
| 2,561,894 | 7/1951 | Wallich | 40/21 C |
| 2,648,924 | 8/1953 | Brewster | 40/2 R |
| 2,670,971 | 3/1954 | Johnson | 282/19 R |
| 3,135,533 | 6/1964 | Short | 40/2 R |
| 3,197,899 | 8/1965 | Twentier | 40/21 C |
| 3,383,121 | 5/1968 | Singer | 282/28 R |
| 3,467,246 | 9/1969 | Long et al. | 40/21 C |
| 4,093,277 | 6/1978 | Nolan et al. | 40/21 C |
| 4,121,961 | 10/1978 | Brunette | 40/2 R |

*Primary Examiner*—Gene Mancene
*Assistant Examiner*—Wenceslao J. Contreras

[57] ABSTRACT

A disposable identification band blank comprising a laminated, elongated flexible body which terminates in overlappable extremities. The laminated body includes a segment of pressure-sensitive record material sandwiched between a flexible base strip and a transparent cover strip which overlies the record material and is adhesively bonded both to the record material and to the base strip.

32 Claims, 8 Drawing Figures

DISPOSABLE IDENTIFICATION BAND BLANK

Matter enclosed in heavy brackets [ ] appears in the original patent but forms no part of this reissue specification; matter printed in italics indicates the additions made by reissue.

This is a continuation, of application Ser. No. 464,750, filed 4/29/74 *now abandoned.*

BACKGROUND OF THE INVENTION

This invention relates to identification bands for identifying patients of hospitals or similar institutions. More particularly, this invention relates to disposable identification bands which cannot be removed without rendering the band unfit for further use and which cannot be altered after an identification marking or inscription is entered on the band.

The use of bands for identification of hospital patients is well known in the art. Such bands are usually secured about a limb of the patient and must not only be relatively strong to resist breakage but must also resist unauthorized tampering with identification markings on the band. Furthermore, in some instances attempts may be made to remove the band without destruction for subsequent unauthorized use, thus it is essential that the identification band be so constructed as to prevent the removal thereof without attendant irreparable damage to the band.

Some prior art identification bands include a metal clip or snap which is uncomfortable to the wearer. Some such bands also require the use of a tool such as pliers for securing about the patient's limb which use is inconvenient to the hospital personnel. Other prior art identification bands provide a pocket in which a previously prepared card bearing the necessary identifying information is inserted and the pocket subsequently sealed. The latter type of identification band is cumbersome to use in that it requires a substantial amount of time for entering the identifying information and for the subsequent assembly manipulations. Moreover, when the patient showers or takes a bath, water may seep into an improperly sealed pocket and may obliterate the identifying information.

Additionally, prior art identification bands could not be manufactured on high-speed automatic equipment to provide high volume production at a relatively low cost because of the relatively complex construction of such bands.

Accordingly, it is an object of the present invention to provide an identification band blank of improved and simplified construction, and which cannot be removed or altered without attendant destruction of the band once information is entered thereon and the band has been secured about a patient's limb.

Another object of this invention is to provide an identification band blank on which the desired information can be readily and conveniently entered and which is resistant to moisture penetration.

Still another object of the present invention is to provide an identification band blank having a construction which enables the band to be easily manufactured by automatic machines.

Additional objects of this invention will readily present themselves upon reference to the ensuing specification, the accompanying drawing, and the claims.

SUMMARY OF THE INVENTION

The present disposable identification band blank is adapted to inscription and subsequent application to a patient's limb and comprises a laminated, elongated, flexible body terminating in overlappable extremities which can be adhesively bonded to each other. The blank is made up of a base strip of flexible, non-irritating material covered on one side with a first adhesive coating. A segment of a pressure-sensitive record material means which displays a distinctive color when subjected to localized pressure is superposed on the base strip and is adhesively bonded to a central portion of the base strip by the aforesaid adhesive coating. A flexible, transparent cover strip is substantially coextensive with the base strip and is provided with a second adhesive coating on a central portion of the cover strip surface which faces the record material means and is substantially coextensive thereto. The cover strip is adhesively secured to the base strip by the first and second adhesive coatings and to the record material means by the second adhesive coating. Further adhesive attachment means is provided on at least one of the band extremities for adhesive attachment of overlapping portions thereof to each other.

DESCRIPTION OF THE PREFERRED EMBODIMENTS

Figure 1:
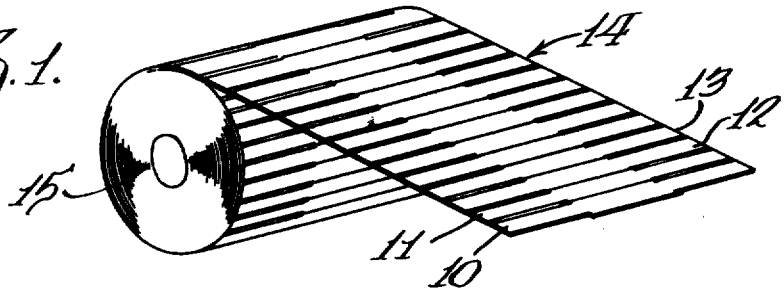
FIG. 1 is a perspective view of a plurality of disposable identification band blanks embodying the present invention arranged in a sheet-like assembly and formed into a roll.

Referring to FIG. 1, disposable identification band blanks such as blanks 10, 11, 12, and 13 are arranged in a side-by-side relationship to form sheet-like assembly 14 which is formed into roll 15. When an identification band blank of this type is about to be used, sheet-like assembly 14 can be conveniently placed into a typewriter and the desired information entered onto the blank as will be described in greater detail hereinbelow.

Figure 2:
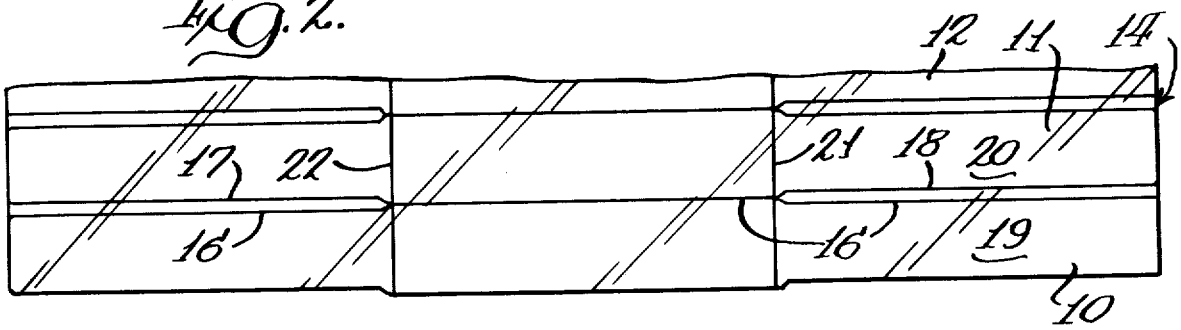
FIG. 2 is a fragmentary plan view of a portion of the sheet-like assembly shown in FIG. 1.
Figure 3:
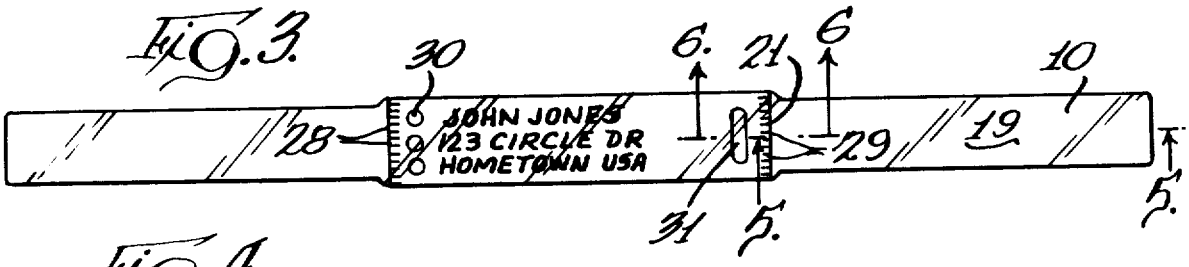
FIG. 3 is a plan view of a disposable identification band blank embodying this invention.

As shown in FIGS. 2 and 3, the individual identification band blanks are serially but detachably connected into sheet-like assembly 14 and severable perforations or lines of weakening, such as lines 16, 17 and 18 between blanks 10 and 11, are provided to facilitate detachment. Cover strips 19 and 20 for blanks 10 and 11, respectively, are flexible and transparent, and pressure-sensitive record material segments 21 [and 22] are clearly visible therethrough. In FIG. 3, blank 10 is shown severed from a sheet-like assembly 14 and with a patient's name and other information entered thereon. In order to provide a relatively larger area for entering the desired information, the central portion of band 10, containing record material segment 21, can be made somewhat wider than the adjacent terminal portions of band 10, if desired.

The pressure-sensitive record material means, a segment of which is incorporated into each identification band blank of this invention, can be a material containing discrete rupturable particles ranging in size from about 0.1 microns to about 4000 microns and which produce a distinctive color when subjected to localized pressure such as can be generated, for example, by a typewriter key, a writing stylus, or a similar instrument. The record material means can be a paper sheet having microencapsulated ink particles coated on the surface thereof and an additional reactant mixed in with the paper fibers of the sheet so that pressure applied by means of a typewriter key or the like ruptures the microcapsules, thus releasing the ink particles which combine with the additional reactant to form a visible marking. Alternatively, a pressure-sensitive sheet of paper can contain rupturable microcapsule material containing discrete particles of two or more reactants which are chemically reactive to produce a distinctive color in the paper at regions where localized pressure rupturing the microcapsule material has been applied. Pressure-sensitive paper of the foregoing type is commercially available and is generally referred to as carbonless paper. Such paper is also described in U.S. Pat. Nos. 2,505,475, 2,550,470, 2,550,471, 2,550,472, and 2,550,473.

The adhesive coatings which contact the pressure-sensitive record material means having rupturable color-producing particles, that is, the first and second adhesive coatings on the base strip and the cover strip, respectively, are made from adhesive materials which do not substantially migrate into the record material means and interfere with its function. For the purposes of this invention suitable such materials are acrylate pressure-sensitive adhesives such as the adhesive commercially available under the designation MP-316 from Morgan Adhesives Co., or the like.

Also suitable are natural or synthetic rubber based adhesives compounded with liquid or solid resin tackifying agents. The elastomer base can be reclaimed natural rubber, styrene-butadiene rubber, styrene-isoprene rubber, butadiene-acrylonitrile rubber, and the like. Typical tackifiers are the polyterpene resins, rosin esters and rosin derivatives, oil-soluble phenolic resins, coumarone-indene resins, polyolefins such as isobutylene and the like, polyvinyl isobutyl ethers. Illustrative pressure-sensitive adhesive of the foregoing type is a composition containing styrene-isoprene block copolymers tackified with a polyolefin and containing an extender oil, described in U.S. Pat. No. 3,239,478. Another suitable rubber-based adhesive is commercially available from Morgan Adhesives Co. under the designation MP-605.

Another type of pressure-sensitive record material means can be an opaque, pressure-clarifiable coating adhesively attached as an underlayer of the cover strip and also adhesively attached to the base strip of a color contrasting with the opaque coating by means of a substantially-transparent pressure-sensistive adhesive. Writing pressure bearing against the cover strip transparentizes the opaque, pressure-clarifiable coating and causes localized adhesion of the base strip to the cover strip, thereby displaying the contrasting color of the base strip in the transparentized regions and thus providing a display of the entered information. Alternatively, the pressure-sensitive adhesive on the base strip can have a color which is contrasting with that of the opaque, pressure-clarifiable coating in which event the color of the base strip is unimportant.

Suitable opaque, pressure-clarifiable coatings are known in the art. Illustrative of such coatings are those described in U.S. Pat. No. 3,753,841 to Wheeler which comprise solutions of dioctyl phthalate, cellulose acetate butyrate and polyethylene glycol dissolved in a mixture of methanol and acetone, and deposited on a film of polyethylene, polyethylene tetraphthalate, polyvinyl chloride, cellophane, or the like, which then serves as the cover strip. Other suitable coatings are disclosed in U.S. Pat. No. 2,939,802 to Werle which comprise a film forming resin dissolved in an organic solvent compatible with water, so that the deposited coating is rendered opaque upon drying because of water vapor condensation thereon.

In addition, the pressure-sensitive record material means can be an integral sheet assembly having its own transparent facing sheet, an opaque pressure-clarifiable coating therebelow, a contrasting pigment-bearing pressure-sensitive adhesive layer coextensively covering the opaque coating, and a foundation sheet covering the adhesive layer. The entire sheet assembly is then sandwiched between the cover strip and the base strip of the identification band blank and adhesively secured thereto using a suitable adhesive material.

Figure 4:
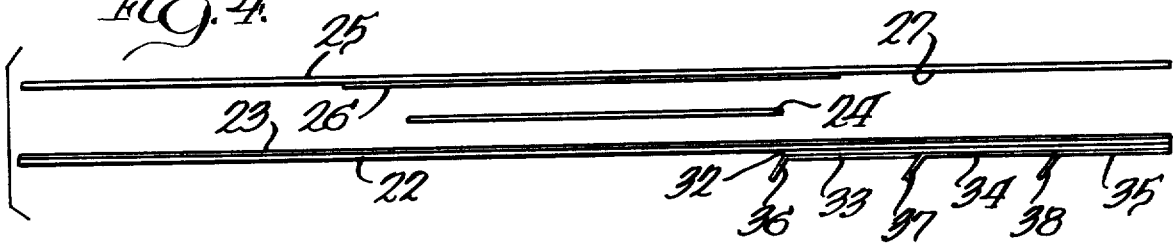
FIG. 4 is an exploded elevational view of the blank shown in FIG. 3.
Figure 5:
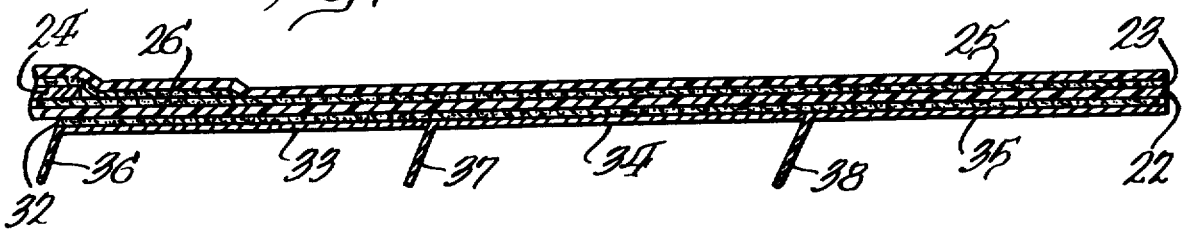
FIGS. 5 and 6 show a sectional elevation taken along line 5—5 in FIG. 3 and enlarged to show interior detail.

Construction details for a preferred identification band blank are illustrated in FIGS. 4 and 5. Base strip 22, made of a flexible, non-irritating material such as polyvinyl chloride sheet, cellophane, polyethylene sheet, cloth or the like material and having a thickness of about 0.001 to about 0.004 inches is provided with first adhesive coating 23 on one side of strip 22. Base strip 22 can be opaque or transparent, as desired.

Pressure-sensitive record material segment 24 is superposed on a central region of base strip 22 and is adhesively bonded thereto by adhesive coating 23. If desired, the size of segment 24 relative to base strip 22 can be selected so that an exposed adhesive area surrounds segment 24 after attachment thereof to base strip 22. Flexible, transparent cover strip 25, usually thinner than base strip 22 but substantially coextensive therewith, overlies record material segment 24 and is adhesively secured to base strip 22 by means of adhesive coating 23 and second adhesive coating 26 which is provided on bottom surface 27 of cover strip 25, i.e., on the surface facing record material segment 24. To accomplish this, preferably second adhesive coating 26 is spread over the central portion of surface 27 so as to cover an area slightly larger than the area of record material segment 24. The resulting band of adhesive-on-adhesive contact between first and second adhesive coatings 23 and 26, respectively, preferably contiguous to the periphery of segment 24, provides a very strong bond between base strip 22 and cover strip 25 and effectively immobilizes segment 24. A peripheral adhesive-on-adhesive band also prevents water penetration to record material segment 24. Additionally, by appropriately matching the bonding strength of adhesive coatings 23 and 26 to the tensile strength of cover strip 25, the produced bond therebetween can be such that cover strip 25 will tear before separation occurs between coatings 23 and 26 in the event unauthorized tampering with the identification band, attempting to gain access to record material segment 24, takes place. Suitable materials for the transparent cover strip are polyvinyl chloride film, cellophane, polyethylene film, polyethylene terephthalate film, polypropylene film, cellulose acetate-butyrate film, polyvinyl acetate film, and the like. Generally, the film thickness should not exceed about 0.004 inches.

Figure 6:
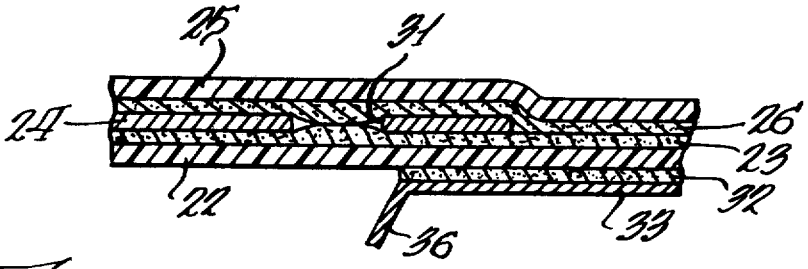

To further discourage unauthorized tampering with record material segment 24, ends or lateral edges thereof can be feathered, i.e., provided with a plurality of spaced slits such as groupings of slits 28 and 29 (FIG. 3) or segment 24 can be provided with perforations such as holes 30 and/or slots 31 within the body thereof (FIGS. 3 and 6) so that an adhesive-to-adhesive bond is established between coatings 23 and 26 in a region or regions within the perimetric limits of segment 24.

Third adhesive coating 32 is provided on that portion of base strip 22 which constitutes an overlapping face of one of the band extremities when the identification band is applied about a patient's limb. For this purpose adhesive coating 32 can be applied on the underside of one end of base strip 22 as shown in FIGS. 4 and 5 and covered with a plurality of contiguous release sheets 33, 34 and 35, each provided with respective grip tabs 36, 37 and 38 to facilitate removal when the band is about to be applied to a patient. Alternatively, the adhesive coating for attaching the identification band can be applied on the complementary top face of cover strip 25 and provided with corresponding release sheet overlays. Also, in lieu of an adhesive coating on at least one band extremity, the extremity can be provided with a non-tacky layer of microencapsulated adhesive material which is released upon application of pressure rupturing the microcapsules.

In use, sheet-like assembly 14 is placed in a typewriter and the necessary information entered onto the pressure-sensitive record material secured within the identification band blank. Thereafter, the prepared identification band is severed from assembly 14 and placed about the wrist or ankle of the patient. As the band is applied, one or more of the release sheet segments is removed, depending on the extent of overlap of the band extremities, and the band is secured in place by simply pressing together the overlapping band extremities with the exposed adhesive coating therebetween.

Figure 7:
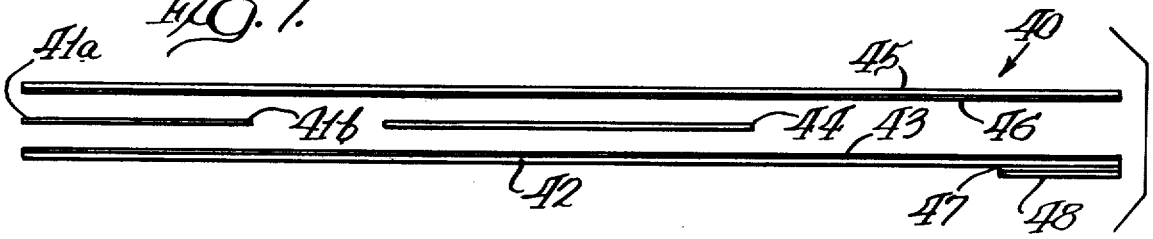
FIG. 7 is an exploded elevational view showing another embodiment of this invention.
Figure 8:
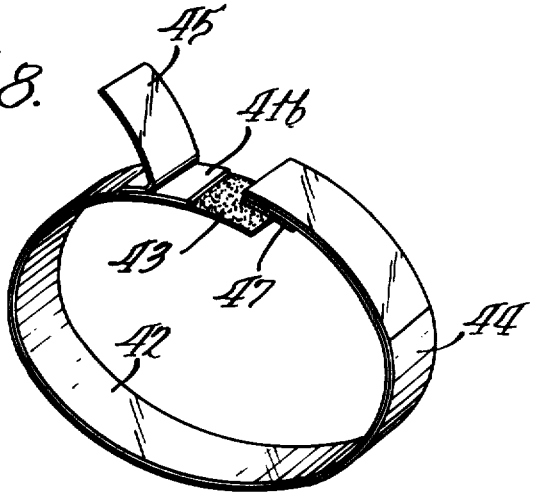
FIG. 8 is a perspective view illustrating the use of the embodiment shown in FIG. 7.

Another embodiment of the present invention is shown in FIGS. 7 and 8. Identification band blank 40 comprises base strip 42 of opaque polyvinyl chloride sheet which is provided with adhesive layer 43 on one side thereof. Flexible, transparent cover strip 45 is likewise provided with adhesive layer 46 so that adhesive layers 43 and 46 are substantially coextensive and face each other. Sandwiched therebetween is pressure-sensitive record material segment 44 which is held in place between base strip 42 and cover strip 45 both by adhesive layer 43 and adhesive layer 46. In addition, one or more release sheet segments having dual release surfaces such as segments 41a and 41b, coextensive in width with base strip 42 and cover strip 45 are sandwiched therebetween at one extremity of band 40 and are adhesively but removably held in place by adhesive layers 43 and 46.

Additional adhesive layer 47 is provided on the underside of base strip 42 at the other extremity of band 40 and is covered by release sheet 48. Preferably the adhesive area provided by adhesive layer 47 is at least as large as the area covered by the outermost of release sheet segments 41a and 41b. By selecting a release sheet material which is more rigid than the base strip, release sheet 48 can be substantially coextensive with adhesive layer 47 and a tap on release sheet 48 can be dispensed with because release sheet 48 will readily separate from base strip 42 and present a grippable portion thereof as base strip 42 is partially folded back on itself.

After the desired information has been entered on record material segment 44, the resulting identification band is prepared for use as shown in FIG. 8. The end portion of cover strip 45 overlying release sheet segments 41a and 41b is peeled back and release sheet segment 41a is stripped off, thereby exposing a portion of adhesive layer 43. Depending on the circumference of the intended patient's wrist or ankle, release sheet segment 41b may additionally have to be removed in order to provide the necessary snug fit. Release sheet 48 is also removed, and exposed adhesive layer 47 is superposed over the exposed portion of adhesive layer 43. Both adhesive layers are then brought in intimate contact to cause adhesive-on-adhesive taction and the attendant bonding of band extremities. Thereafter, the peeled-back end portion of cover strip 45 is adhesively attached over the underlying extremity of base strip 42 to complete the affixation of the identification band to the patient.

The foregoing specification and the accompanying drawing are intended as illustrative and are not to be taken as limiting. Still other variations and modifications of this invention are possible without departing from the spirit and scope thereof.

I claim:

1. A disposable identification band blank adapted for inscription and subsequent application to a patient's limb which is a laminated, elongated, flexible body terminating in overlappable extremities and comprising a base strip of flexible non-irritating material; a first adhesive coating on one side of the base strip; a segment of pressure-sensitive record material means displaying a distinctive color when subjected to localized pressure superposed on and adhesively bonded to a central portion of the base strip; a flexible, transparent cover strip coextensive with said base strip and adhesively secured to said base strip; a second adhesive coating on at least a central portion of the cover strip surface which faces said segment of pressure-sensitive record material means and adhesively bonding the central portion of the cover strip to said segment of a pressure-sensitive record material means and to said base strip; and adhesive attachment means on at least one of said band extremities for adhesively bonding overlapping portions of the band extremities; said adhesive attachment means comprising a third adhesive coating on an overlapping face of one of said extremities and at least one release sheet segment having dual release surfaces at the other of said extremities and being removably disposed between said base strip and said cover strip; said third adhesive coating being situated on an overlapping face of the base strip at said extremities and covered with a release sheet substantially coextensive therewith; and said release sheet covering said third adhesive coating being more rigid than the extremity bearing said third adhesive coating.

2. The disposable identification band blank in accordance with claim 1 wherein a strip of release paper is held in place over said third adhesive coating.

3. The disposable identification band blank in accordance with claim 2 wherein said strip of release paper is divided into a plurality of release paper segments and wherein each of said release paper segments is provided with a pull tab.

4. The disposable identification band blank in accordance with claim 1 wherein the pressure-sensitive record material means contains discrete rupturable particles which produce a distinctive color when subjected to localized pressure.

5. The disposable identification band blank in accordance with claim 1 wherein the pressure-sensitive record material means comprises an opaque, pressure-clarifiable coating.

6. The disposable identification band blank in accordance with claim 1 wherein said segment of a pressure-sensitive record material means is carbonless paper.

7. The disposable identification band blank in accordance with claim 1 wherein said first adhesive coating and said second adhesive coating are in adhesive contact with each other about the periphery of said segment of pressure-sensitive record material means.

8. The disposable identification band blank in accordance with claim 7 wherein said adhesive attachment means comprises a third adhesive coating on an overlapping face of one of said extremities and at least one release sheet segment having dual release surfaces at the other of said extremities and removably disposed between said base strip and said cover strip.

9. The disposable identification band blank in accordance with claim 8 wherein said third adhesive coating is covered with a release sheet.

10. A plurality of disposable identification band blanks, each in accordance with claim 1, serially detachably connected in a sheet-like assembly having a severable line of weakening between adjacent identification band blanks.

11. A disposable identification band blank adapted for inscription and subsequent application to a patient's limb which is a laminated, elongated, flexible body terminating in overlappable extremities and comprising a base strip of flexible non-irritating material; a first adhesive coating on one side of the base strip; a segment of pressure-sensitive record material means displaying a distinctive color when subjected to localized pressure superposed on and adhesively bonded to a central portion of the base strip; a flexible, transparent cover strip coextensive with said base strip and adhesively secured to said base strip; a second adhesive coating on at least a central portion of the cover strip surface which faces said segment of pressure-sensitive record material means and adhesively bonding the central portion of the cover strip to said segment of a pressure-sensitive record material means and to said base strip; and adhesive attachment means on at least one of said band extremities for adhesively bonding overlapping portions of the band extremities; said pressure-sensitive record material means being an integral sheet assembly comprising a transparent facing sheet, an opaque, pressure-clarifiable coating on the underside of said facing sheet, a contrasting pigment-containing adhesive layer over said opaque coating, and a foundation sheet over said adhesive layer; said facing sheet being adhesively bonded to said cover strip; and said foundation sheet being adhesively bonded to said base strip.

12. A plurality of disposable identification band blanks, each in accordance with claim 11, serially detachably connected in a sheet-like assembly having a severable line of weakening between adjacent identification band blanks.

13. A disposable identification band blank adapted for inscription and subsequent application to a patient's limb which is a laminated, elongated, flexible body terminating in overlappable extremities and comprising a base strip of flexible non-irritating material; a first adhesive coating on one side of the base strip; a segment of pressure-sensitive record material means displaying a distinctive color when subjected to localized pressure superposed on and adhesively bonded to a central portion of the base strip; a flexible, transparent cover strip coextensive with said base strip and adhesively secured to [sad] *said* base strip; a second adhesive coating on at least a central portion of the cover strip surface which faces said segment of pressure-sensitive record material means and adhesively bonding the central portion of the cover strip to said segment of a pressure-sensitive record material means and to said base strip; and adhesive attachment means on at least one of said band extremities for adhesively bonding overlapping portions of the band extremities; said segment of pressure-sensitive record material means being provided with perforations within the perimetric limits of the segment; and said cover strip being adhesively bonded to said base strip through said perforations.

14. A disposable identification band blank adapted for inscription and subsequent application to a patient's limb which is a laminated, elongated, flexible body terminating in overlappable extremities and comprising a base strip of flexible non-irritating material; a first adhesive coating on one side of the base strip; a segment of pressure-sensitive record material means displaying a distinctive color when subjected to localized pressure-superposed on and adhesively bonded to a central portion of the base strip; a flexible, transparent cover strip coextensive with said base strip and adhesively secured to said base strip; a second adhesive coating on at least a central portion of the cover strip surface which faces said segment of pressure-sensitive record material means and adhesively bonding the central portion of the cover strip to said segment of a pressure-sensitive record material means and to said base strip; and adhesive attachment means on at least one of said band extremities for adhesively bonding overlapping portions of the band extremities; said segment of a pressure-sensitive record material means being provided with feathered edges.

*15. A plurality of individual patient identification bands removably associated with one another in side-by-side relationship across the width of a sheet-like assembly having a length dimension and a width dimension, each band comprising a base sheet of flexible non-irritating material, adhesive means on one side of said base sheet, pressure sensitive record material means secured to said base sheet by said adhesive means to form a laminate having a length dimension greater than its width dimension; and attachment means at least one side margin of said laminate for securing the band about the limb of a patient.*

*16. The assembly set forth in claim 15 wherein said individual patient identification bands are releasably interconnected to one another.*

*17. The assembly set forth in claim 15 wherein each band includes a transparent cover sheet secured over said record material means.*

*18. The assembly set forth in claim 15 wherein each record material means is a pressure clarifiable layer.*

*19. The assembly set forth in claim 18 wherein the adhesive means is a colored adhesive coating visible through said pressure clarifiable layer in areas to which pressure has been applied.*

*20. The assembly set forth in claim 15 wherein the base sheet is colored and is visible through said pressure clarifiable layer in areas to which pressure has been applied.*

*21. The assembly set forth in claim 15 wherein said attachment means is an adhesive coating extending along at least one side margin of the laminate.*

*22. The assembly set forth in claim 21 wherein adhesive is provided at both side margins of the laminate whereby an adhesive-to-adhesive closure can be effected.*

*23. A plurality of releasably interconnected disposable identification bands adapted for inscription and subsequent application to a patient's limb comprising: a base sheet of flexible non-irritating material; adhesive means on one side of said base sheet; pressure sensitive record material means secured to said base sheet by said adhesive means to form a laminate having a length dimension and a width dimension; adhesive attachment means extending along at least one side margin of said laminate; and means defining a plurality of longitudinally spaced lines of weakening extending across the width of said laminate and dividing said laminate into a plurality of identification bands having a length dimension greater than their width dimension.*

*24. The structure defined in claim 23 wherein each band includes a transparent cover sheet secured over said record material means.*

*25. A plurality of releasably interconnected disposable identification bands adapted for inscription and subsequent application to a patient's limb comprising: a base sheet of flexible non-irritating material; adhesive means on one side of said base sheet; an intermediate sheet secured to said base sheet by said adhesive. means; a flexible cover sheet superposed over said intermediate sheet and secured at least to said intermediate sheet to form a laminate having a length dimension and a width dimension; said intermediate sheet including pressure clarifiable means for displaying indicia through said cover sheet when pressure is applied to said intermediate sheet through said cover sheet; adhesive attachment means extending along at least one side margin of said laminate; and means defining a plurality of longitudinally spaced lines of weakening extending across the width of said laminate and dividing said laminate into a plurality of identification bands having a length dimension greater than its width dimension.*

*26. A disposable identification band adapted for inscription and subsequent application to a patient's limb which is a laminated, elongated, flexible body terminating in overlappable extremities and comprising a base strip of flexible non-irritating material; a first adhesive means on one side of the base strip; pressure-sensitive record material means displaying a distinctive color when subjected to localized pressure superposed on and adhesively bonded to the base strip; a flexible cover strip coextensive with said base strip and secured to said pressure-sensitive record material means; adhesive attachment means on at least one of said band extremities for adhesively bonding overlapping portions of the band extremities; and at least one release member covering said adhesive attachment means and detachably secured thereto for exposing said adhesive attachment means when said band is to be secured about the limb of a patient.*

*27. The structure set forth in claim 26 including means removably associating a plurality of identification bands with one another in side-by-side relationship to form a sheet-like assembly.*

*28. The structure set forth in claim 26 wherein said plurality of identification bands are releasably interconnected to one another.*

*29. A disposable identification band adapted for inscription and subsequent application to a patient's limb which is a laminated, flexible body having a length dimension greater than its width dimension and terminating in overlappable extremities, said blank comprising a first layer in the form of a base strip of flexible non-irritating material: a second layer in the form of a strip superposed on and bonded to the base strip; a third layer in the form of a flexible cover strip coextensive with said base strip and secured to said second layer; said second layer including pressure clarifiable means for displaying indicia through said cover strip which pressure is applied to said second strip through said cover strip; and adhesive attachment means on at least one of said band extremities for adhesively bonding overlapping portions of the band extremities.*

*30. A disposable identification band adapted for inscription and subsequent application to a patient's limb which is a laminated, elongated, flexible body terminating in overlappable extremities and comprising a base strip of flexible non-irritating material; pressure-sensitive record material means displaying a distinctive color when subjected to localized pressure superposed on and bonded to the base strip; a flexible cover strip coextensive with said base strip and secured to said pressure-sensitive record material means, said cover strip being transparent at least in areas in alignment with the areas of said pressure-sentitive record material means which are subject to localized pressure; and adhesive attachment means on at least one of said band extremities for adhesively bonding overlapping portions of the band extremities.*

*31. A disposable patient identification band adapted for inscription and subsequent application to a patient's limb comprising: a thin, elongated flat main body portion having overlappable ends; pressure sensitive record material means associated with said main body portion and adapted to display indicia in localized areas in response to pressure applied thereto; pressure sensitive adhesive means associated with at least one end of said main body portion for providing adhesive-to-adhesive engagement when said ends are positioned in overlapping engagement; and release means removably associated with said adhesive means for protecting said adhesive means prior to securement of said identification band about the limb of a wearer.*

*32. The structure set forth in claim 31 wherein an area of pressure sensitive adhesive is provided at each end of said main body portion.*

* * * * *